United States Patent Office 3,541,405
Patented Nov. 17, 1970

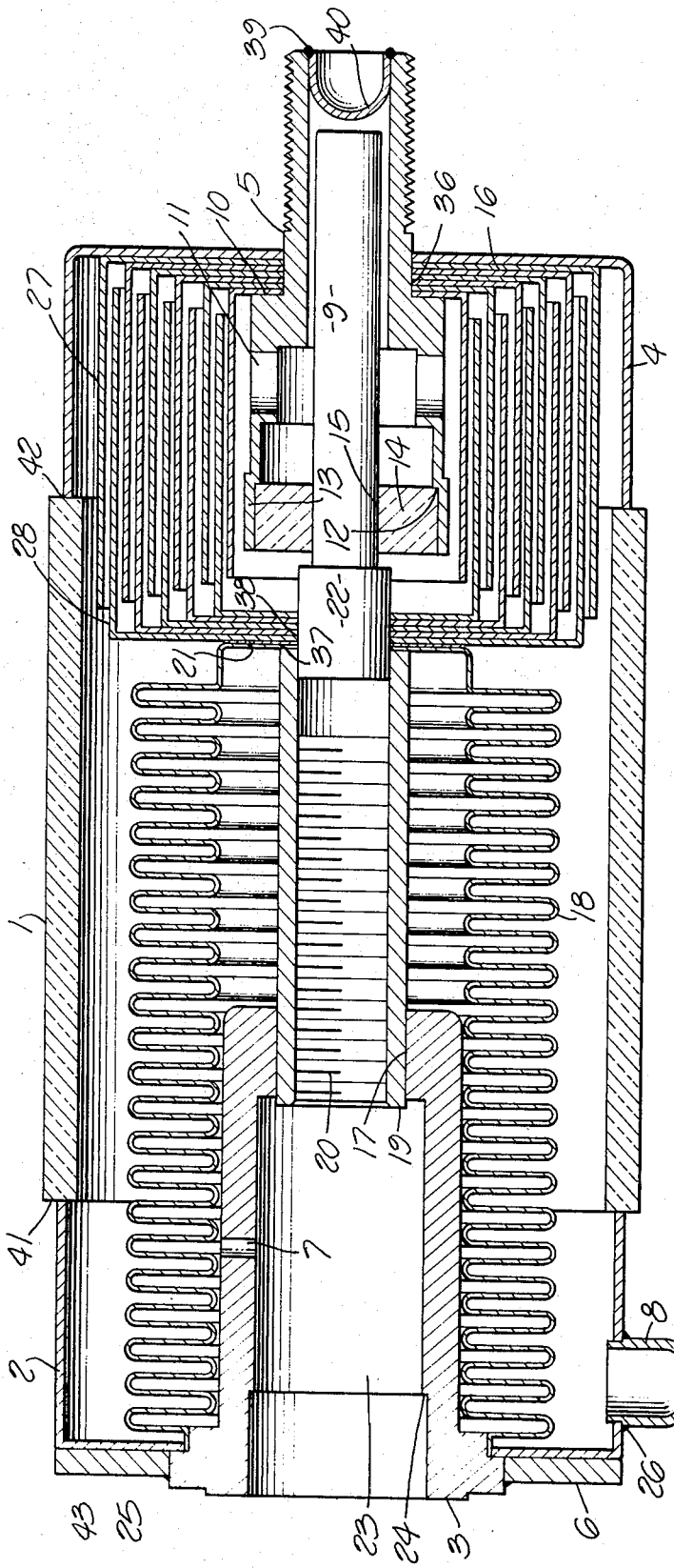
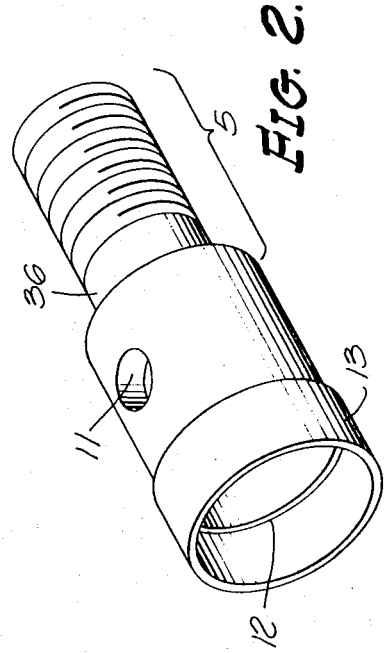

3,541,405
HERMETICALLY SEALED VARIABLE CAPACITOR WITH OPTIMUM MOVABLE PLATE SHAFT BEARING STRUCTURE
Joseph Emil Oeschger, Palo Alto, Calif., assignor to International Telephone and Telegraph Corporation, New York, N.Y., a corporation of Delaware
Filed Apr. 30, 1969, Ser. No. 820,451
Int. Cl. H01g 5/04
U.S. Cl. 317—245      5 Claims

ABSTRACT OF THE DISCLOSURE

A variable vacuum capacitor having a ceramic body shell and metal end bells and a plurality of fixed concentric cylindrical plates mounted inside near one end of said body shell and a corresponding plurality of axially interleaving movable plates mounted on a shaft assembly. The shaft assembly is mounted through two thrust bearings; one of said bearings (internal) being located at a position within the axial length of the fixed plates, and the other (external) being mounted within the body shell between the plates and the opposite end of the body shell at a point where it supports one end of the shaft assembly and allows for shaft overtravel within the end bell at that end. The external bearing and its support are within a metal bellows open to the atmosphere at the same end. The metal bellows is attached (vacuum tight) near the center of the shaft assembly and compresses and extends axially with movement of the shaft assembly. The volume around the plates (including the internal bearing) is sealed and evacuated. An independent concentric hollow spindle fixed end mount supports the internal bearing and relieves the fixed plates of any structural load therefrom while also providing overtravel space for the internal end of the shaft assembly.

The nature of the individual parts is such that subassembly operations are minimal, virtually all parts being finally assembled through a single furnace brazing (hard soldering) operation. Solder (hard) discs are assembled with the parts to effect this advantage.

BACKGROUND OF THE INVENTION

Field of the invention

This invention relates to variable capacitors as electrical components and more particularly to improved variable capacitors in sealed and evacuated vessels or envelopes. This invention also relates to structure allowing an improved manufacturing method whereby the number of assembly steps is reduced.

Description of the prior art

In the prior art, vacuum capacitors have been designed and built in various configurations. U.S. Pat. 2,511,338 issued June 13, 1950, to J. E. Jennings, entitled "Variable Vacuum Capacitor," describes an early and relatively basic version. Other versions involving differing plate configurations, various glass envelope shapes, ceramic body shells, and variations in cooling methods, etc., have been described in the literature.

U.S. Pat. 3,257,590 issued June 21, 1966, to R. W. Hansen, entitled "Vacuum Variable Capacitor," illustrates a version in which an internal (within the evacuated vessel) bearing restrains a thrust rod from lateral (radial) motion. That thrust rod controls the movable plate set axially, and if constrained from lateral motion, the movable plates are similarly constrained. This type of constraint has been found necessary not only for ruggedization of the device against environmental shock and vibration, but also because alternating or pulsed currents flowing in these capacitors tend to cause electrostatic forces to be set up between fixed and movable plates, particularly at high current levels. The resulting electrostatically induced vibration can have the effect of reducing the breakdown or arcing voltage threshold of a capacitor or even bring about gradual or abrupt mechanical failure within the unit.

Referring again to the prior art device of the aforementioned U.S. Pat. 3,257,590, it will be noted that the internal bearing of that device is supported by the innermost of the fixed cylindrical plates. Thus the said innermost plate is necessarily made of heavier material so as to be more rigid than its companion plates. This necessitates additional manufacturing and tooling expense, the heavier material being more difficult to form by the usual drawing or spinning methods to the accuracy required. Moreover, it will be obvious that any lateral shaft and inner bearing vibration in that structure, however small, would have the effect of "modulating" the spacing between this innermost plate and the adjacent movable plate.

It is also to be noted that most prior art devices of this general character include structure which requires that internal adjustments be made in the pre-sealing manufacturing process. Further, most such prior art devices contain structural elements which require that their body shell assemblies or outside envelopes contain many parts or complex external shapes, whether in glass or ceramic.

The device of the present invention with its improved bearing mounting will be seen to be structurally relatively simple as well as rugged, reliable, and affording illumination of many subassembly steps, allowing significant savings in manufacturing costs.

SUMMARY OF THE INVENTION

In view of the recognized disadvantages of the prior art, it was an achieved object of the present invention to provide an internal bearing support structure which is independent of the actual capacitor plates, and also more rigid and in optimum placement with respect to shaft overtravel.

It is to be noted also that, in many applications, it is important to minimize the size of the capacitor for given voltage and current ratings. In the present invention, another objective realized was the elimination of as much structure as possible as compared to prior art devices without sacrificing performance and thereby actually gaining compactness and ruggedness.

The present invention comprises a ceramic body shell of circular cross-section with metallic end bells attached by known techniques. For convenience, the ends of the device and the corresponding end bells will be identified as fixed end and variable end—an identification obvious from the drawings at a glance.

In the realm of manufacturing or process novelty, the invention provides for furnace brazing (hard soldering) on a "one shot" basis. This is because all the parts are designed so that a relatively simple axial clamping jig can hold the entire assembly in position during the brazing operation. Virtually all of the parts are assembled and secured during this brazing operation, no significant prior subassembly operations being required.

BRIEF DESCRIPTION OF THE DRAWINGS

For illustration and to aid in describing the present invention drawings are presented as follows:

FIG. 1 is a sectional view of the fully assembled variable vacuum capacitor. The sectioning plane contains the axial center line of the device.

FIG. 2 is a partially sectioned, isometric view of the internal bearing retaining hollow spindle.

DESCRIPTION OF THE PREFERRED EMBODIMENT

Figure 3:
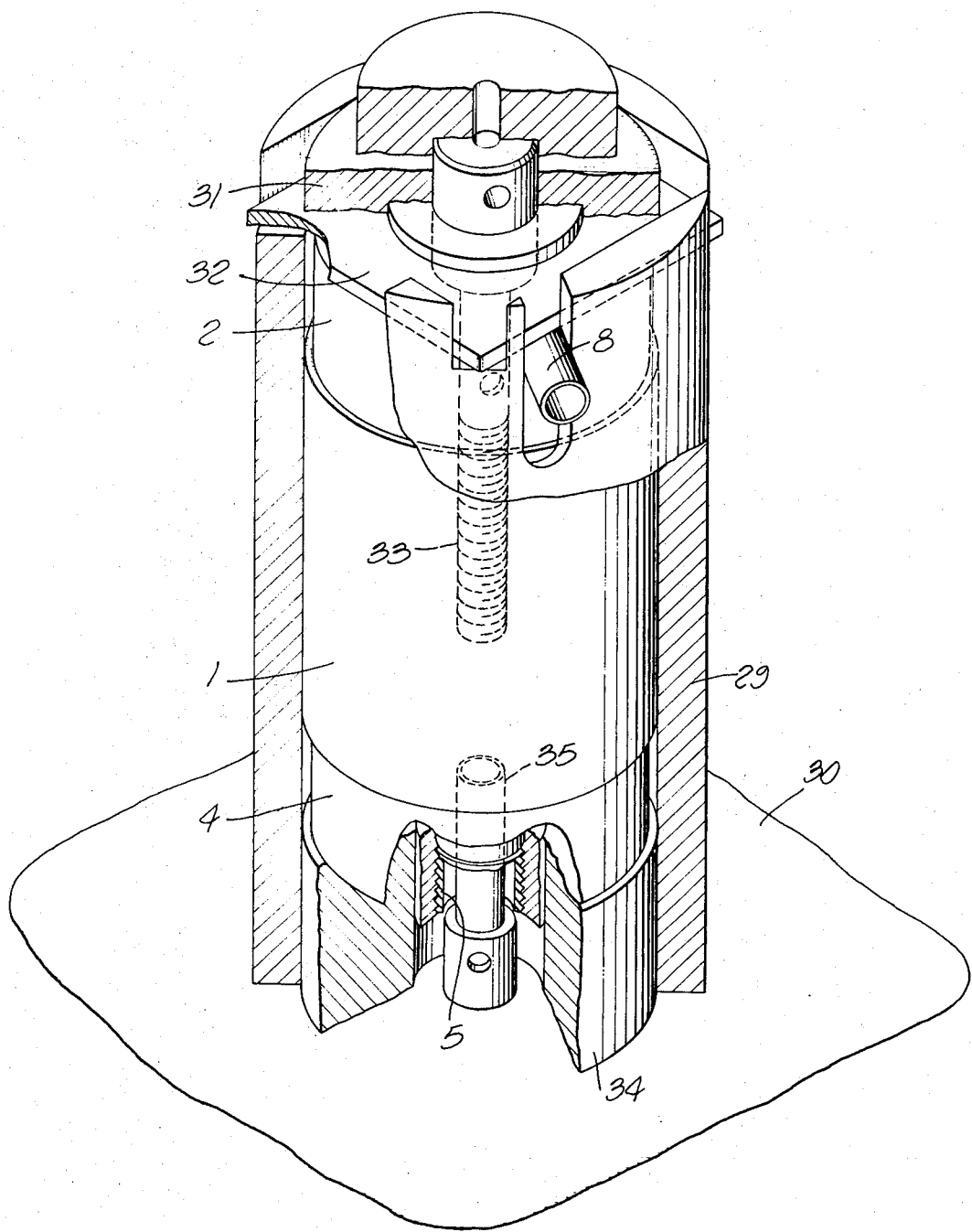
FIG. 3 is a partially sectioned isometric view of the capacitor assembled in a brazing jig.

Referring to FIG. 1, it will be noted at the outset that this embodiment is of overall tubular shape. A section taken transversely to the axial centerline at most points along said centerline would have a circular outline and would be entirely symmetrical about the center of the view. Exceptions would be where the section is taken through the recessed bearing collet 3 at the hole 7 or at the tubulation 8.

Basically, the assembly is comprised of two enclosed sets (fixed and variable) of cup or can shaped concentric interleaving plates. A typical (the outermost) can of the fixed set is shown at 27. All of the fixed cans (plates) have bottom center holes of the same size so that they may be fitted onto the small outer diameter of hollow spindle 5 at 36. The same is true of end bell 4. When these fixed cans and end bell 4 are brazed together against the shoulder 10 of spindle 5, these parts become a rigid integral assembly.

Much the same can be said of the movable plates (cans) (the outer one of which is 28) in respect to their mounting and brazing over 22 at 38 and against the shoulder provided at 37 by the internal end of the internally threaded sleeve 19. The said parts 19, 22 and 9 are joined to form a one piece shaft. At least the part of this shaft identified at 9 is tungsten carbide and may be joined to 19 by appropriate brazing or welding and trued by an appropriate machining operation.

The internal end of the metal bellows 18 will be seen to join in the brazed joint between 19 and the variable plates, thereby sealing the atmospheric pressure extant inside the bellows 18 from the space about the plates.

The shaft assembly at its 19 end slip fits at 17 in the exterior bearing collet 3, thereby forming the exterior bearing for the shaft.

It will be noted that the other end of bellows 18 is brazed to the bearing collet 3, which in turn joins the other end bell 2 and a mounting plate 6 as shown. The said mounting plate 6 is square or rectangular in its planar dimensions and is intended to provide means for mounting the entire capacitor assembly.

The cylindrical ceramic body 1 will be seen to be butt jointed to the two end bells 2 and 4. These joints are secured also in the furnace brazing operation to follow, the ends of the ceramic body having been pretreated in a known manner to accept the brazing. The said pretreatment includes fusing of a molybdenum manganese agent onto the ceramic ends at high temperature and subsequently nickel plating the area. The end bells, being metallic, do not require pretreatment before the brazing operation.

In the illustration of FIG. 1, the plates are shown fully meshed or nearly so. The metal bellows 18 is capable of being axially contracted and exerts a compressive axial force tending to mesh the plates or keep them meshed. Such force is due to bellows spring action as well as to air pressure tending to extend the bellows. Accordingly, adjustment is made by means of a manual or power driven lead screw which engages the threads 20 to pull the shaft assembly sleeve 19 into the recess 23 in the bearing collet 3. Such a lead screw may bear against the shoulder 24 for this purpose.

The bellows 18 is constrained from significant lateral movement or buckling since the collet 3 acts as a mandrel or guide therefor. When the bellows is most compressed, the collet is within the greatest portion of its length.

It will be noted that the volume within the bellows surrounding the shaft sleeve 19 changes as the bellows extends or contracts. Although the bearing surface at 17 could be expected to leak enough to prevent build-up of pressure changes in the said volume, a relief hole 7 through the side wall of the recess in the bearing collet 3 is provided to prevent temporary or transient pressure changes during capacitor adjustment. The said recess will be seen to provide axial clearance for the overtravel of sleeve 19 as the capacitor movable plates are withdrawn.

It will be noted that the volume between the bellows outer perimeter and within the ceramic body and end bells is evacuated.

Considering now the interior bearing bushing 14 (within the evacuated volume), this part operates as a bearing at surface 15 for shaft 9. It has been found that materials ranging from high alumina ceramic to synthetic sapphire are satisfactory for the bearing bushing 14 as these materials afford desirable vacuum lubrication qualities against the tungsten carbide shaft portion 9. Thus a close tolerance fit at bearing surface 15 can be achieved without galling or binding.

The bearing bushing 14 is pressed into the largest inside diameter of the hollow spindle 5 within its largest outside diameter 13, and rests as illustrated against an inside shoulder 12. Overtravel of shaft 9 will be seen to be accommodated in the interior bore of the threaded end of 5.

The element 40, which is a metal cup shaped seal, is heliarc welded around the perimeter of its contact with the spindle 5 inside bore edge as illustrated at 39. The element 40 may be relied upon as a shorting contact when shaft 9 advances into contact with it. In some particular designs, it is desired that the capacitor be shorted out of a circuit, which it would in fact be, if 9 contacts 40.

The tabulation 8 is shown pinched off, which it would be after evacuation and degassing as a last step of manufacture after the final assembly brazing operation hereinafter described in more detail, and after welding in of element 40.

FIG. 2 depicts the hollow bearing spindle 5 graphically so that the hole 11 which is drilled diametrically through both walls, as well as other aspects of this vital part, is clearly understood. Numeric symbols correspond on FIG. 2 to the same callouts on FIG. 1.

The structure supporting the bearing 14 will be understood to afford unusual strength and simplicity whereby the shaft subassembly consisting of 9, 22 and 19 (and therefore the variable plates) are rigidly constrained from lateral movement.

Referring now to FIG. 3, the process of final assembly of a vacuum capacitor according to the invention will be described, with reference back to FIG. 1, as necessary.

The brazing jig of FIG. 3 is cut-away so that it will be understood how the final assembly operation is advantageously performed in a "one-shot" brazing operation, as for example, in a chain type furnace. The hand assembled capacitor is mounted in the jig of FIG. 3, and therein held while processed in the said furnace.

The jig itself comprises a cylinder 29 into which the ceramic body of the capacitor assembly fits as illustrated. The cylinder stands vertically on a base plate 30. End bells 2 and 4 will be seen to be compression retained by a jig top plate 31 and a bottom cylindrical block 34. The threaded end of spindle 5 is visible where it threads into a retaining bushing inside 34. A lead screw 33 holds the alignment of the exterior end of the capacitor shaft by engaging the threads 20, and the alignment device 35 tends to preserve the axial alignment of 5, especially with respect to the shaft 9 during brazing, by insertion over 9 and inside 5. The seal member 40 is, of course, not yet installed, its installation being effected between furnace brazing and evacuation steps.

The tabulation 8 is shown open in FIG. 3, which it would be during brazing. Since the capacitor assembly is axially assembled into the jig, and a slot in the cylinder 29 is therefore required to clear the tabulation 8, as illustrated.

The details of the jig of FIG. 3 are subject to considerable variation, its illustration serving only to document the advantageous "one shot" final assembly brazing made possible by the structural features of the capacitor assembly.

Various relief holes are extant in the jig at key locations to avoid internal pressure build-up during the brazing operation.

A key fact not yet discussed, is the assembly of the unit with the brazing materials in the form of thin washers installed as if they were individual assembly component parts.

Thus, as the fixed cans are fitted onto 5, washers of brazing material (typically a silver-copper alloy) are emplaced between cans, typically at 16 and against the shoulder 10. Similarly, the variable cans have brazing alloy washers between cans and at 21, where the bellows end joins the variable cans.

The shaft comprising parts 19, 22 and 9 which, as previously indicated, was prefabricated and machine trued, was brazed using an alloy of higher melting temperature than that used in the final assembly operation now being discussed, so that there is no softening of the brazed joints among 19, 22 and 9.

Braze material washers are also fitted between end bell 2 and mounting plate 6 and bearing collet 3 at 43, and at 41 and 42, as these parts are assembled, after the bearing spindle containing the pressed in bearing bushing 14 is fitted with the fixed cans and end bell 4, and after the shaft is inserted with movable cans and bellows fitted thereon.

Heliarc welds at 25 and 26 may be effected, if necessary after final assembly brazing at the time 40 is installed.

From the foregoing, it will be apparent that the capacitor unit structure uniquely lends itself to axial assembly and the aforementioned "one-shot" final assembly brazing.

Several additional expedients for assuring optimum alignment of the fixed and variable plates (cans) are also available. One of these includes forming the inside movable can bottom, in the form of a convex cylindrical projection, so that an over engagement of the cans (for manufacturing only) possible in the absence of 40, brings the said convex projection snugly into the open end of the innermost fixed can.

Another expedient for can alignment consists of applying a soluble crystaline salt of high melting temperature by means of a thin coat of a cementing agent around the can perimeters at or near thin open ends prior to assembly. The said salt and residue from the cementing agent may then be removed by flushing with water or another suitable solvent after final assembly brazing.

It will be noted that, prior to installation of seal 40, a flushing path exists between the open threaded end of spindle 5, through holes 11, and back and forth between the meshed plates (cans) through the volume between the bellows 18 and the ceramic body 1 and end bell 2, thence out the open tubulation 8.

Concerning selection materials not already discussed, known criteria have been applied. The ceramic body 1 would be one common to the vacuum tube and capacitor prior art. Such ceramics may be processed at higher temperatures than glass and provide certain outgassing advantages.

Due consideration must be given to differential coefficients of expansion, especially in view of the final assembly brazing operation. Where it is important that expansions and contractions be comparable, similar materials are used. Monel metal is known to closely match the temperature coefficient of expansion of Phosphor bronze and these materials have applicability for corrosion resistance and machinability (for Monel) and high strength and resilient qualities for Phosphor bronze.

Other advantages may be inferred from an understanding of the structures and methods described. Also, various modifications will suggest themselves to those skilled in this art. The herewith drawings are to be regarded as illustrative only and not defining the limits of the inventive concepts.

What is claimed is:

1. A variable capacitor assembly comprising:
   an envelope including a hollow cylindrical insulating sleeve with first and second end bells sealed to the ends of said insulating sleeve;
   a fixed set of coaxial cylindrical plates formed by a plurality of open-ended cans of conductive material concentrically mounted within said first end bell;
   an axial conductive shaft on which a movable set of plates is coaxially and conductively mounted, said movable plates being formed of a second set of open-ended cans sized to interleave said fixed plates in response to axial motion of said shaft;
   internal bearing and support means for supporting said shaft with axial sliding freedom, comprising a hollow spindle of circular cross-section mounted coaxially through said first end bell and having an internally projecting socket end in which said internal bearing is mounted, and an externally projecting hollow spindle portion, whereby said shaft may overtravel into said external spindle portion when said plates are meshed; and
   external bearing and support means for supporting said shaft with axial sliding freedom, comprising a hollow collet projecting inward within said envelope from said second end bell, said collet including a recess cavity open to the outside of said envelope through said second end bell to provide an overtravel space for shaft when said plates are withdrawn, said collet including a coaxial hole of diameter less than said recess but greater by a fit allowance than the corresponding diameter of said shaft, at a location substantially at the inwardly projecting end of said collet, thereby to provide said external bearing.

2. Apparatus according to claim 1 in which said collet projects inwardly from said second end bell by an amount at least equal to the total travel of said shaft and said hollow spindle projects inwardly from said first end bell by an amount such that said internal bearing is located inwardly by a predetermined axial distance not exceeding the axial length of said fixed coaxial plates.

3. In a hermetically sealed vacuum capacitor mounted in an envelope having metallic end bells joined to a generally tubular insulating mid-section, having a set of fixed incurvated plates mounted within one of said end bells, and having a movable set of incurvated plates joined to an axially slideable shaft, whereby meshing and withdrawal of said movable plates with respect to said fixed plates is effected by sliding said shaft axially, comprising:
   a first bearing for slideably supporting said shaft;
   means including a hollow member supported coaxially from the one of said end bells adjacent said fixed plate set, said hollow member forming a socket holding said first bearing at a point within the axial length of said fixed incurvated plates;
   and a second bearing mounted to axially slideably support said shaft, said second bearing comprising the surface of a coaxial hole in the end of an inwardly projecting hollow member supported from the other of said end bells, said hollow member being of a length placing said second bearing between the axial point reached by said movable plates fully withdrawn and said other end bell.

4. The invention set forth in claim 1 in which said hollow cylindrical sleeve is ceramic and said end bells are metal.

5. The invention set forth in claim 1, further defined in that said second end bell includes an evacuation tubulation and said hollow spindle contains at least one side wall opening whereby a flushing path is formed from one end of said hollow spindle outside said first end bell, through said spindle side wall opening, and through said plates and said tubulation.

References Cited
UNITED STATES PATENTS

| | | | |
|---|---|---|---|
| 2,511,338 | 6/1950 | Jennings | 317—245 X |
| 3,242,397 | 3/1966 | Jennings | 317—245 |
| 3,257,590 | 6/1966 | Hansen | 317—245 |

ELLIOT A. GOLDBERG, Primary Examiner

U.S. Cl. X.R.

317—251